(12) United States Patent
Harris

(10) Patent No.: US 12,702,117 B2
(45) Date of Patent: Aug. 11, 2026

(54) LEASH TRAINING DEVICE

(71) Applicant: Rachel T. Harris, San Francisco, CA (US)

(72) Inventor: Rachel T. Harris, San Francisco, CA (US)

( * ) Notice: Subject to any disclaimer, the term of this patent is extended or adjusted under 35 U.S.C. 154(b) by 0 days.

(21) Appl. No.: 18/797,423

(22) Filed: Aug. 7, 2024

(65) Prior Publication Data

US 2025/0048995 A1 Feb. 13, 2025

Related U.S. Application Data

(60) Provisional application No. 63/532,204, filed on Aug. 11, 2023.

(51) Int. Cl.
*A01K 15/02* (2006.01)
*A01K 27/00* (2006.01)

(52) U.S. Cl.
CPC ............ *A01K 15/02* (2013.01); *A01K 27/003* (2013.01)

(58) Field of Classification Search
CPC ...... A01K 27/003; A01K 15/02; A01K 27/00; A01K 15/00; A01K 29/00
See application file for complete search history.

(56) References Cited

U.S. PATENT DOCUMENTS 5,647,303 A * 7/1997 Deioma ............... A01K 27/001 119/864
7,051,682 B2 * 5/2006 Clute ................... A01K 27/001 119/864
2005/0241596 A1 * 11/2005 Deverall ............. A01K 27/003 119/792
2008/0134989 A1 * 6/2008 Weiss ................... A01K 27/003 119/793
2015/0223432 A1 * 8/2015 Lund .................... A01K 27/003 119/795
2020/0154678 A1 * 5/2020 Harrison ............. A01K 27/008

* cited by examiner

*Primary Examiner* — Christopher D Hutchens
*Assistant Examiner* — Nevena Aleksic
(74) *Attorney, Agent, or Firm* — Larisa Migachyov

(57) ABSTRACT

A leash-training device is disclosed, wherein the leash training device hangs on a leash while an animal is walking on the leash, and drags on the ground when the animal walks with the right amount of leash slack. The dragging on the ground makes noise, which provides audible feedback to the animal that it is maintaining the proper amount of slack on the leash. This enables leash training to take place without hurting the animal.

16 Claims, 4 Drawing Sheets

LEASH TRAINING DEVICE

CROSS-REFERENCE TO RELATED APPLICATIONS

The present application takes priority from Provisional App. No. 63/532,204, filed Aug. 11, 2023, which is incorporated herein by reference.

BACKGROUND

Field of the Invention

The present invention relates generally to pet leashes, and more particularly to systems and methods to train a pet to walk on a leash without pulling.

Background of the Invention

Dogs and other animals need to be actively trained for walking on a leash, and one of the bad habits that can develop with leash-walking is the habit of pulling on a leash. If a dog is large, this can create significant problems for the owner. Many devices exist on the market for training dogs to walk on a leash without pulling it; typically, such devices are designed to provide the dog with negative feedback when it pulls—for example, a choke collar that constricts the dog's neck when it pulls or a harness that puts pressure on the dog's body when it pulls. However, such devices are inhumane and many owners are reluctant to use them for this reason. Also, many dogs become immune to the effects of such devices after a while.

Dogs are smart animals and eager to please their owners; thus, if there were a way to explain to a dog what leash tension is appropriate, most would eagerly do the right thing. However, it is difficult for a dog to gauge the right amount of slack in the leash while it is walking, and dogs do not understand lengthy verbal explanations.

A need exists for a device to teach a dog to walk properly on a leash without pulling by providing positive feedback for when the dog does it correctly.

LIST OF FIGURES

SUMMARY OF THE INVENTION

Figures 1A, 1B:
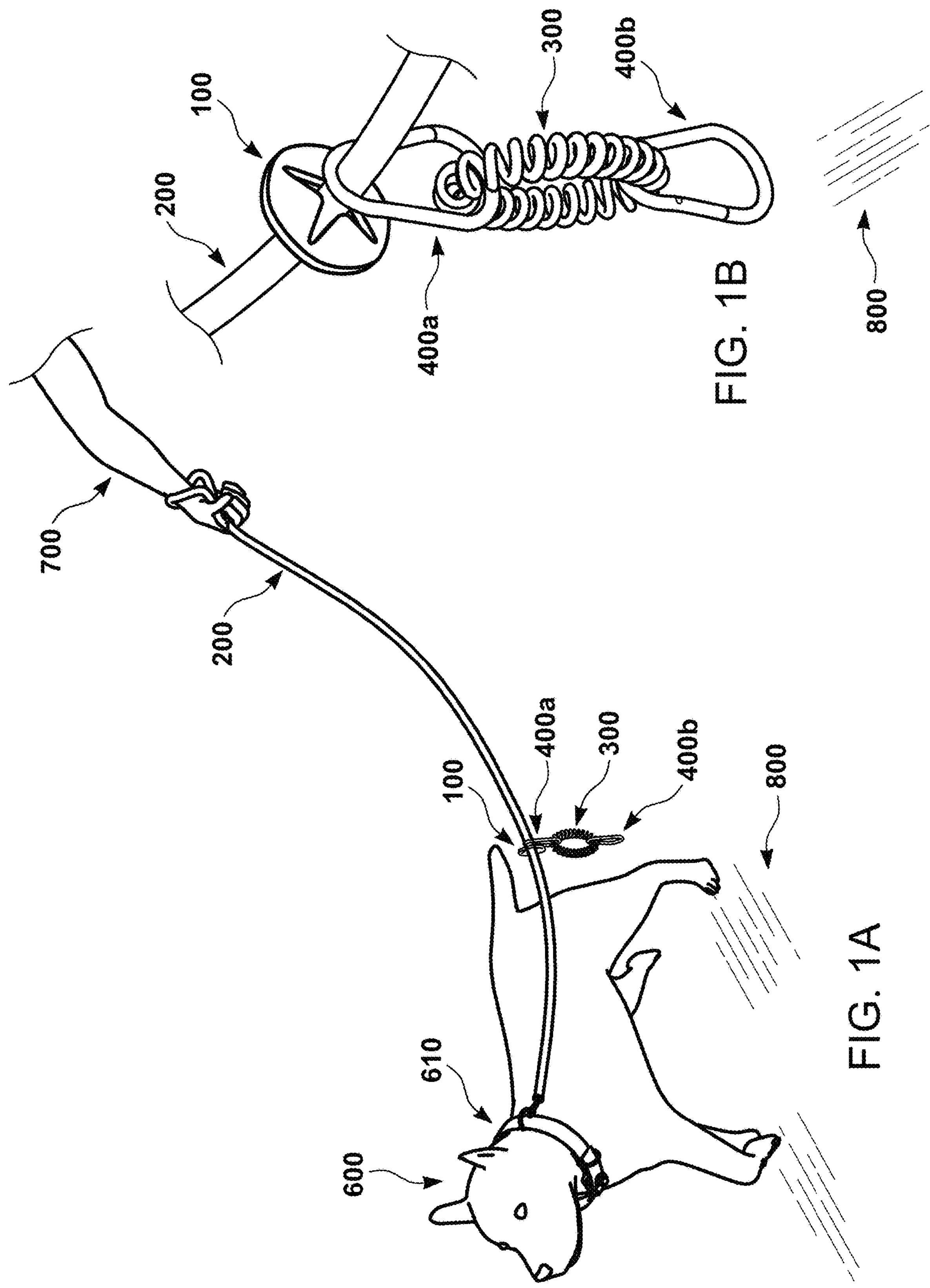
FIG. 1A shows an embodiment of the present invention in use.
FIG. 1B shows a close-up view of an embodiment of the present invention in use.

An object of the present invention is to provide a device that gives an animal appropriate feedback for the amount of correct tension on a leash while the animal walks on the leash and provides feedback for when the animal pulls the leash too tight.

Another object of the present invention is to provide a method for training an animal to walk on a leash correctly without pulling.

The system of the present invention comprises a suspended attachment that hangs on a leash somewhere between the collar end and the handle end. The suspended attachment is of such a length that it drags on the ground when the dog is walking at an appropriate distance from a human holding the leash, and lifts up off the ground when the leash is pulled taut.

The suspended attachment may emit a sound, light up, vibrate, or emit a scent when it is dragged on the ground and not emit a sound, turn off the light, stop vibrating, or stop emitting the scent when it is lifted off the ground. In an alternate embodiment, the suspended attachment does not emit any sort of signal when it is dragging on the ground and emits a signal (visual, auditory, vibratory, or scent) when it is lifted off the ground.

In an embodiment, the suspended attachment is configured to make a noise when it is dragged on the ground and to make no noise when it is lifted off the ground. In an embodiment, it comprises a plurality of removable links that are linked to each other, and in an embodiment, the links can be made of metal. In an embodiment, the links alternate between plastic and metal links to reduce rattling and weight. The suspended attachment may also comprise a stopper that can be attached to the leash at any point between the collar end and the handle end, which can stop the loop of the suspended attachment from sliding all the way to the collar end.

The suspended attachment may be between 1" and 35" long. In an embodiment, its length is adjustable.

The method of the present invention comprises attaching a leash to an animal's collar, attaching a loop to the leash so that it can slide freely on the leash, attaching a suspended attachment to the loop so that it drags on the ground when the animal is walking at the correct distance from the person holding the leash, and walking with the animal for as long as the suspended attachment is dragging on the ground. If the suspended attachment lifts off the ground, the person stops until the animal moves closer to the person. Once the suspended attachment is on the ground again, the person resumes the walk.

In an embodiment, the suspended attachment emits a signal when it is dragging on the ground and does not emit a signal when it is lifted off the ground. In another embodiment, the suspended attachment emits a signal when it is lifted off the ground and does not emit a signal when it is dragging on the ground. The signal can be visual, auditory, vibratory, or olfactory.

In an embodiment, the suspended attachment makes a noise when it is dragged on the ground and makes no noise when it is lifted off the ground.

In an embodiment, the method of the present invention also comprises incrementally reducing the length of the suspended attachment as the animal learns the appropriate distance between itself and the person. In an embodiment, the suspended attachment is eventually removed altogether.

DETAILED DESCRIPTION

An object of the present invention is to provide a device that gives an animal appropriate feedback for the amount of correct tension on a leash while the animal walks on the leash and provides feedback for when the animal pulls the leash too tight.

While the below disclosure focuses on dogs, it is not meant to be limiting in this respect; any animal that can walk on a leash, such as a cat, may also use the present invention.

Figures 2A, 2B:
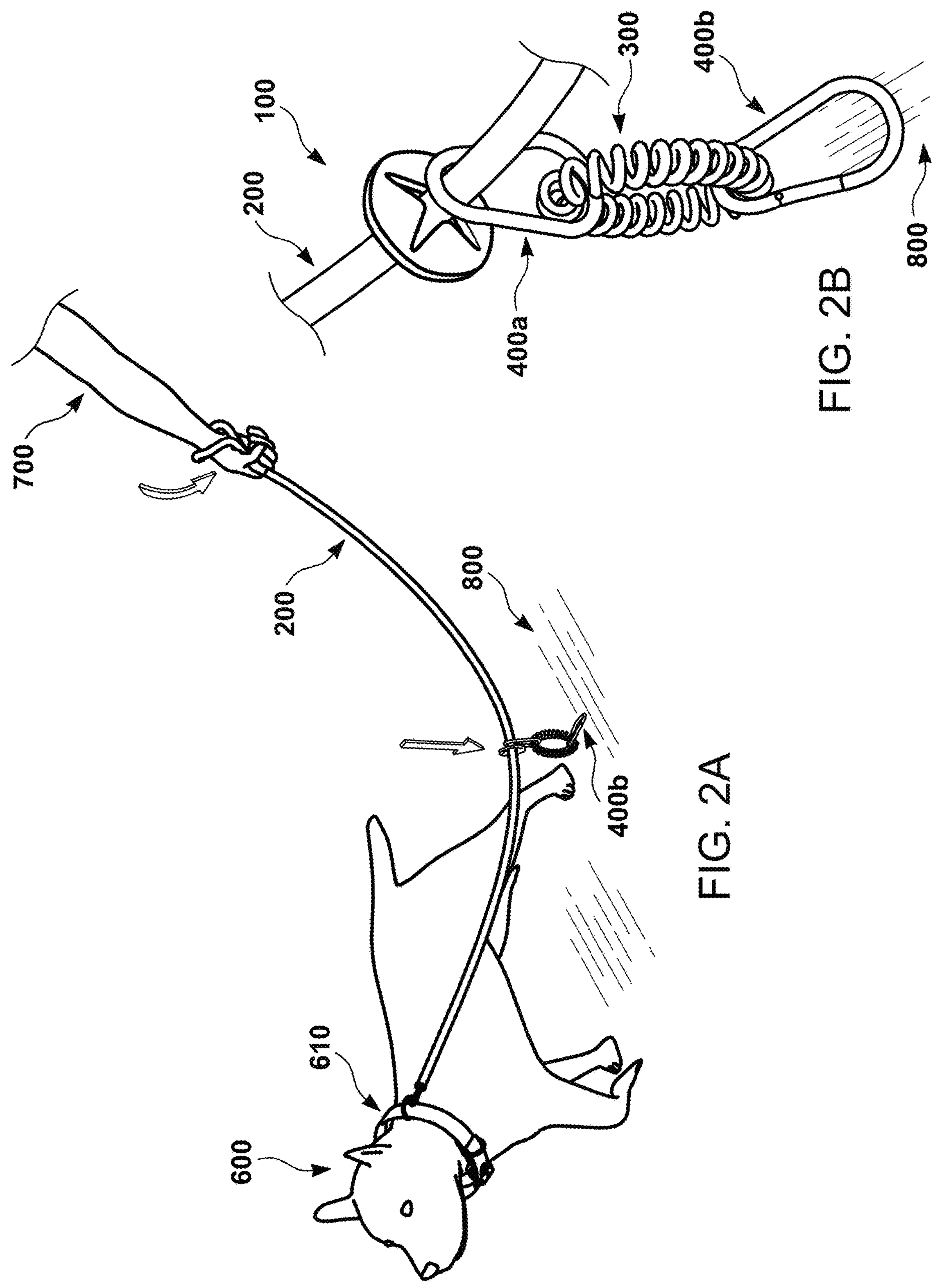
FIG. 2A shows an embodiment of the present invention in use.
FIG. 2B shows a close-up view of an embodiment of the present invention in use.

FIGS. 1A and 2A show an embodiment of the device of the present invention in use. Briefly, it is a suspended attachment that attaches to a leash 200 as shown. A human 700 holds the leash 200, which is attached to the collar 610 of a dog 600. The suspended attachment is attached around the leash 200 as shown in FIGS. 1B and 2B. It comprises multiple links (here, shown as 300, 400*a*, and 400*b*) that hang down from the leash 200. A stopper 110 prevents the suspended attachment from sliding all the way down to the dog's collar. When a dog is walking correctly on the leash, as shown in FIG. 2A, the suspended attachment drags on the ground 800, making a noise. If a dog pulls the leash too tight, as shown in FIG. 1A, the suspended attachment comes off the ground 800 and the noise stops. The auditory feedback provides the dog with a cue that it is pulling the leash too tight, and provides the human with a cue as well. To train the dog to not pull the leash, the human can stop walking every time the suspended attachment comes off the ground, and only resume walking when the suspended attachment returns to the ground.

Figure 3:
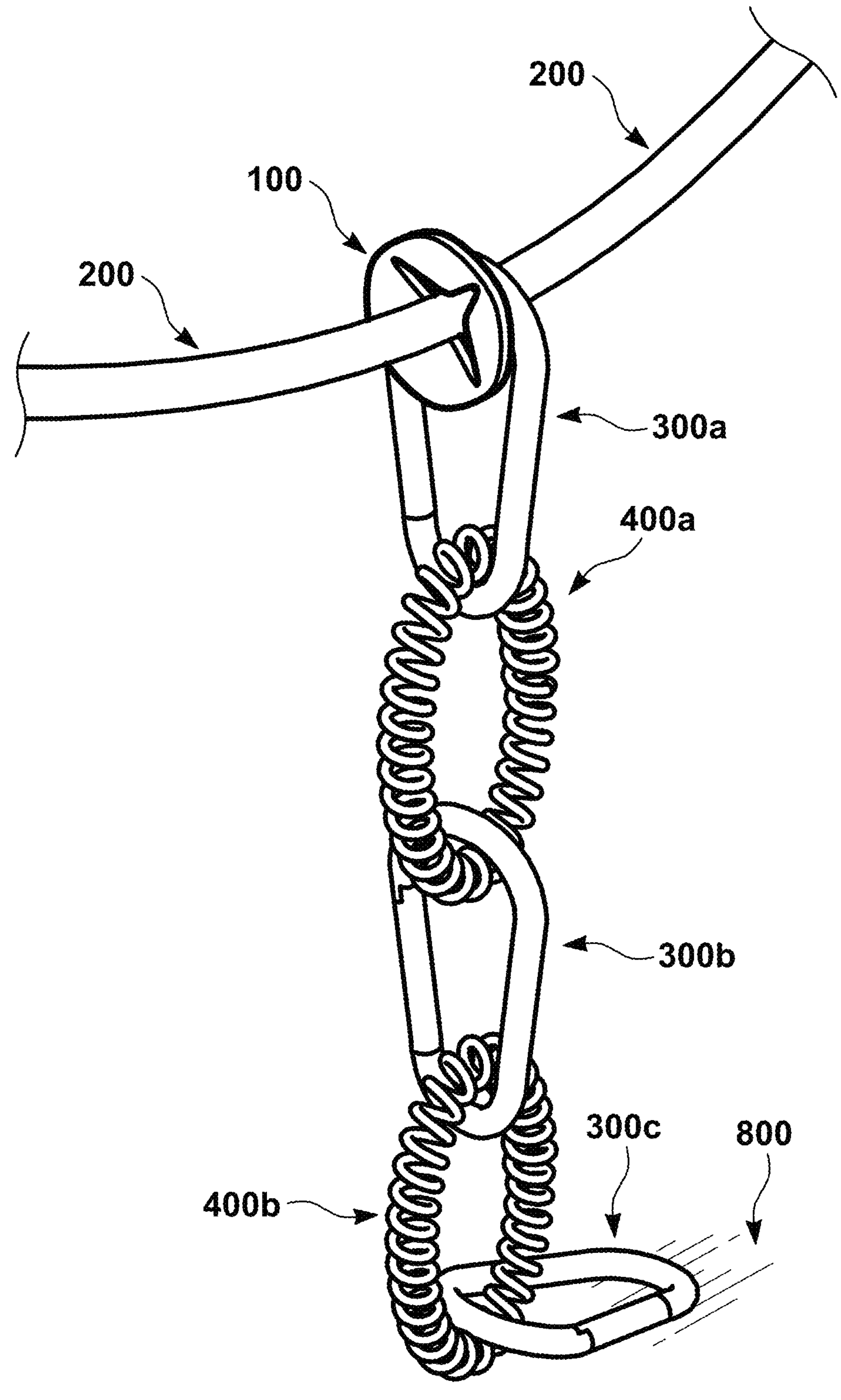
FIG. 3 shows a close-up view of an embodiment of the present invention in use.

FIG. 3 shows a closer view of the suspended attachment hanging on a leash 200. As shown, multiple links are attached to each other in a chain and hang off the leash, with a stopper 110 to prevent the suspended attachment from getting too close to the dog's collar, body, or face. In the embodiment shown, metal carabiner links 300*a*, 300*b*, and 300*c* alternate with plastic spring links 400*a* and 400*b*. This prevents rattling while the device is off the ground, making the feedback to the dog (and the human) clearer. To ensure the right kind of sound feedback when the device is dragging on the ground 800, the bottom-most link should be a metal link.

While the suspended attachment displayed in the Figures comprises alternating metal links and spring links as shown, any type of removable links that can be linked together in a chain can be used for the present invention, as can any other hanging device that can hang off a leash without being too heavy for the dog or the human to handle. The only requirement is that the dog (or the human) should be able to tell the difference between the device dragging on the ground and the device hanging off the ground.

If a dog is very tall and the suspended attachment needs to be long, a strip of fabric, twine, rope, or other flexible and lightweight linear member, may be used to extend its length. The linear member may be attached to a removable link at the top, for attachment to the leash, and to another removable link at the bottom. Other links may then be added to the bottom of the suspended attachment as needed.

Figure 4A:
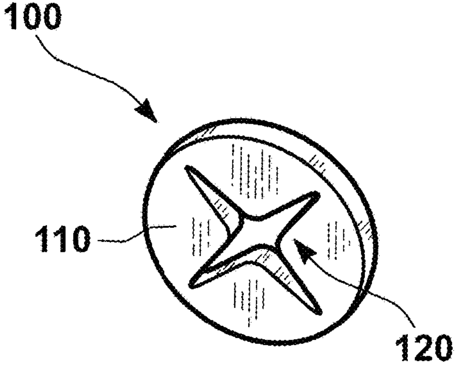
FIG. 4A shows a close-up view of a stopper from an embodiment of the present invention.

In an embodiment, a stopper 110 is used to prevent the suspended attachment from sliding all the way to the dog's collar, which could be annoying and frightful for the dog. The stopper may be a flexible plastic or rubber disc 120 with a star-shaped cutout 130 as shown, which can removably attach to a leash without sliding back and forth, as shown in FIG. 4A. In other embodiments, the stopper can be configured in any other way, as long as it can be attached to the leash in a removable way and as long as it can stay in the same place on the leash and prevent the suspended attachment from sliding past it.

Figure 4B:
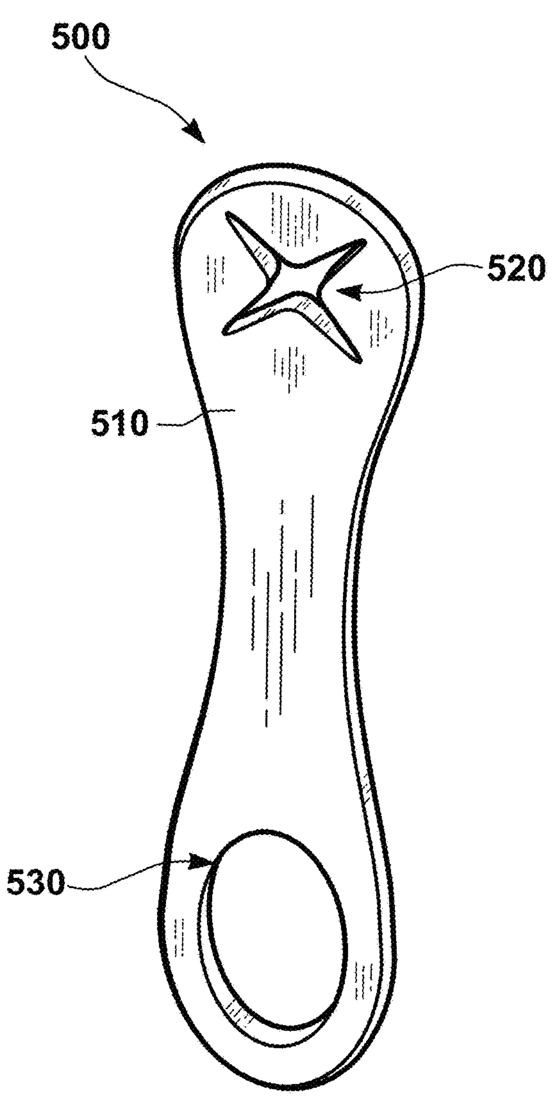
FIG. 4B shows a close-up view of an integrated stopper link from an embodiment of the present invention.

The stopper may also be integrated with a link in the chain as shown in FIG. 4B—the integrated movable stopper 500 comprises a body 510, with a star-shaped cutout 520, and a hole 530 for the attachment of a link as shown.

In an embodiment, the length of the body of the suspended attachment is adjustable. The Figures show an embodiment that comprises multiple links that can be linked or unlinked as desired. This may be used to adjust the suspended attachment length to an individual dog's size, or for gradual training of the dog to train it to walk closer and closer to the owner. For example, an owner could start with four links, then after the dog has mastered that step, go down to three, then two, then one; this would gradually train the dog to walk very close to the owner on a very loose leash.

The weight of the suspended attachment is preferably just enough to provide enough force to pull the leash down to the ground so that it can touch the ground. In an embodiment, the weight of the suspended attachment is 2 oz., but it can also be 1 oz., 3 oz., 5 oz., or any other weight that pulls the leash down to the ground without being so heavy that it interferes with the leash's function.

The length of the suspended attachment is preferably such that it drags on the ground when there is a little slack in the leash. This depends on the size of the dog, the place where the leash attaches to the dog (at the shoulders or at the chest), and the desired distance between the dog and the owner during the walk. In an embodiment, the length of the suspended attachment is anything from 1" to 35".

In an embodiment (not shown), the suspended attachment comprises a light-up module that is visible to either the dog or the person holding the leash. In an embodiment, the light-up module can emit light when the suspended attachment is dragging on the ground and turn off when the suspended attachment is lifted off the ground. In another embodiment, the light-up module can turn off when the suspended attachment is dragging on the ground and light up when the suspended attachment is lifted off the ground. The color of the light can be any color that is easily visible outdoors, such as white, blue, green, red, or any other color. In an embodiment, the light-up module blinks in a regular pattern rather than being steadily lit up, to increase visibility.

In an embodiment (not shown), the suspended attachment comprises a speaker that emits a sound (such as a beep or a chirp). In an embodiment, the speaker emits sound when the suspended attachment is dragging on the ground and turns off when the suspended attachment is lifted off the ground. In another embodiment, this is reversed and the speaker emits sound when the suspended attachment is lifted off the ground and is silent when the suspended attachment is dragging on the ground. The sound may be a high frequency audible only to dogs, and may be repeated bursts of sound rather than a continuous sound.

In an embodiment (not shown), the suspended attachment comprises a vibratory module that produces a vibration that can be felt through the leash (by either the dog or the person). As above, the vibratory module can produce vibrations (steady or short bursts) when the suspended attachment is dragging on the ground and no vibrations when the suspended attachment is lifted off the ground, or vice versa.

In an embodiment (not shown), the suspended attachment comprises a module that generates a scent. The scent module can produce a scent when the suspended attachment is dragging on the ground and turn off when the suspended attachment is lifted off the ground, or vice versa. The scent may be any scent that is perceptible to dogs or humans, and may be produced at an intensity that can be perceived by a dog but not by a human.

The method of the present invention is used to train a dog to walk on a loose leash by providing it (and the human walking it) with feedback when it pulls the leash too tight. To do so, the suspended attachment is attached to the animal's leash, and the length of the suspended attachment is adjusted so that when it touches the ground, the animal is at the desired distance from the person holding the leash. The human then walks the dog. If the dog pulls the leash too tight and the suspended attachment lifts off the ground, the human should stop. This gives the dog a signal that the walk will only continue as long as the suspended attachment is dragging on the ground, and that if it pulls the leash too tight, the walk stops. This assists the animal in learning the appropriate distance and leash tension.

If the owner wishes to train the dog to walk even closer, they can incrementally reduce the length of the suspended attachment—for example, by removing links from it. Once the dog understands that the suspended attachment is supposed to drag on the ground in order for the walk to take place, it will move closer as the length of the suspended attachment is reduced.

Once the dog is trained to not pull on the leash and to walk at the appropriate distance, the suspended attachment can be removed altogether.

Exemplary embodiments are described above. It will be understood that the present invention incorporates other embodiments that comprise reasonable equivalents to the elements of the above described embodiment.

The invention claimed is:

1. A system for leash training a dog, comprising:
- a leash comprising a collar end and a handle end;
- a loop that can slide freely on the leash between the collar end and the handle end;
- a suspended attachment hanging from the loop, wherein the suspended attachment is shorter than the vertical distance between the collar end and the ground when the system is in use;
- wherein the suspended attachment is of such a length that it drags on the ground when a dog is walking at an appropriate distance from a human holding the leash,
- wherein the suspended attachment comprises a first removable link and a second removable link, wherein the first removable link and the second removable link are linked together in a chain;
- wherein the suspended attachment lifts up off the ground when the leash is pulled taut.

2. The system of claim 1, wherein the suspended attachment emits a signal when it is dragging on the ground and does not emit the signal when it is lifted off the ground, and wherein the signal is one or more of the following: auditory, visual, vibratory, scent.

3. The system of claim 1, wherein the suspended attachment does not emit a signal when it is dragging on the ground and emits the signal when it is lifted off the ground, and wherein the signal is one or more of the following: auditory, visual, vibratory, scent.

4. The system of claim 1, wherein the suspended attachment is configured to make a noise when it is dragged on the ground and to make no noise when it is lifted off the ground.

5. The system of claim 1, further comprising:
- a movable stopper that can be attached to the leash at any point between the collar end and the handle end, wherein the stopper is located between the loop and the collar end, and wherein the stopper can stop the loop from sliding all the way to the collar end.

6. The system of claim 5, wherein the movable stopper is integrated with the loop.

7. The system of claim 1, wherein the removable links are made of metal.

8. The system of claim 1, further comprising a third removable link, wherein at least one removable link is made of metal, wherein at least one removable link is made of plastic, and wherein at least one plastic removable link is linked between two metal links.

9. The system of claim 1, wherein the suspended attachment is between 1" and 35" long.

10. The system of claim 1, wherein the length of the suspended attachment is adjustable.

11. A method of leash training an animal, comprising:
- attaching a leash to the animal's collar;
- attaching a loop to the leash in such a way that the loop can slide freely on the leash;
- attaching a suspended attachment to the loop, wherein the suspended attachment is configured to drag on the ground when the animal is walking at a correct distance from a person holding the leash;
- walking with the animal for as long as the suspended attachment is dragging on the ground;
- if the suspended attachment is lifted off the ground, stopping the walk until the animal moves closer to the person holding the leash;
- if the suspended attachment is dragging on the ground again, resuming the walk.

12. The method of claim 11, wherein the suspended attachment emits a signal when it is dragging on the ground and does not emit the signal when it is lifted off the ground, and wherein the signal is one or more of the following: auditory, visual, vibratory, olfactory.

13. The method of claim 11, wherein the suspended attachment does not emit a signal when it is dragging on the ground and emits the signal when it is lifted off the ground, and wherein the signal is one or more of the following: auditory, visual, vibratory, olfactory.

14. The method of claim 11, wherein the suspended attachment is configured to make a noise when it is dragged on the ground and to make no noise when it is lifted off the ground.

15. The method of claim 11, further comprising:
- incrementally reducing the length of the suspended attachment after the animal has learned the appropriate distance between itself and the person.

16. The method of claim 15, further comprising:
- removing the suspended attachment altogether after the animal has learned the appropriate distance between itself and the person.

* * * * *